Jan. 1, 1935.  W. T. HONISS  1,986,575
APPARATUS FOR AND METHOD OF DELIVERING MOLTEN GLASS
Filed April 5, 1932    2 Sheets-Sheet 1
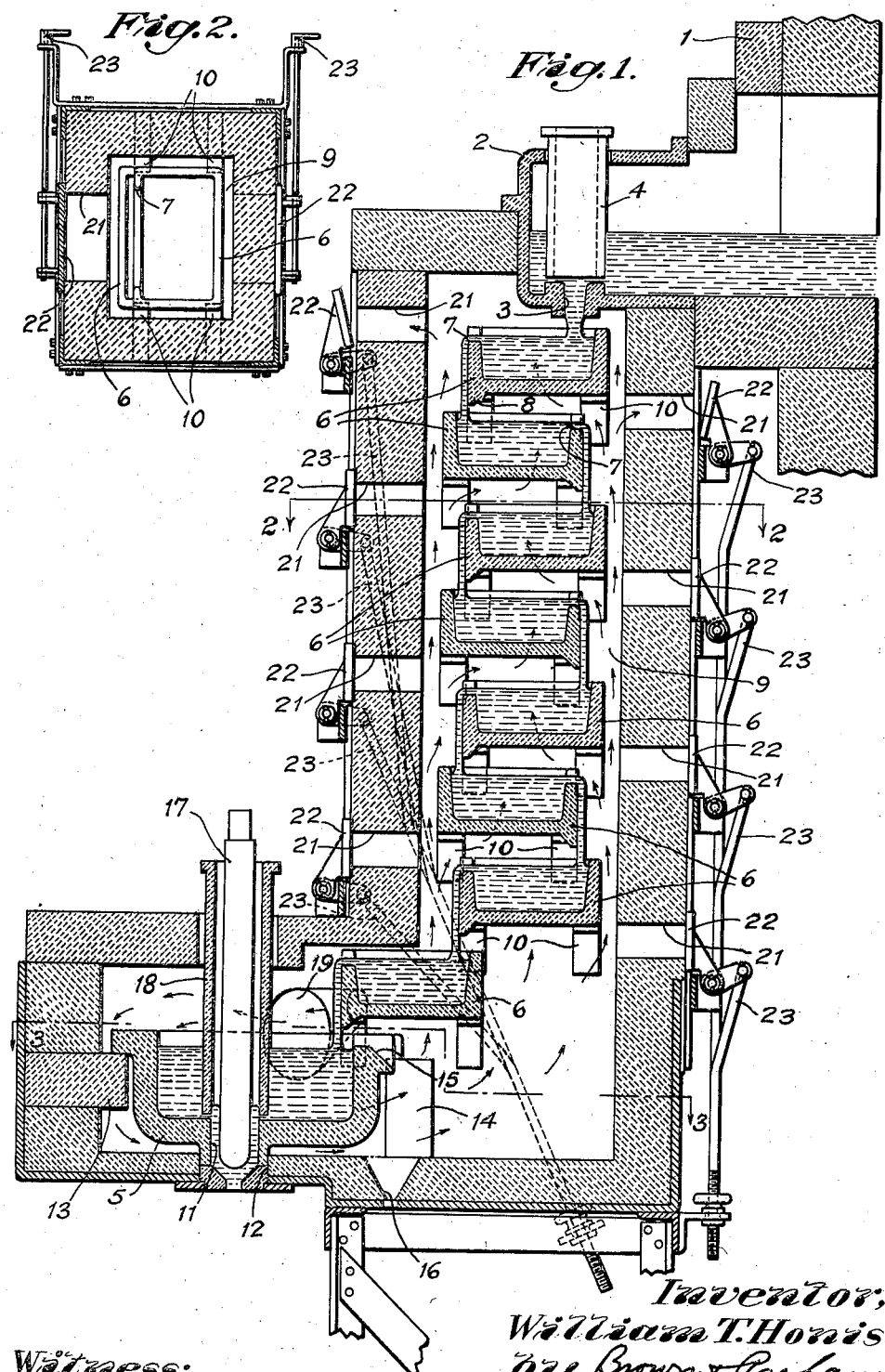
Inventor:
William T. Honiss
by Brown & Parham
Attorneys
Witness:
W. B. Thayer Jan. 1, 1935. W. T. HONISS 1,986,575
APPARATUS FOR AND METHOD OF DELIVERING MOLTEN GLASS
Filed April 5, 1932   2 Sheets-Sheet 2
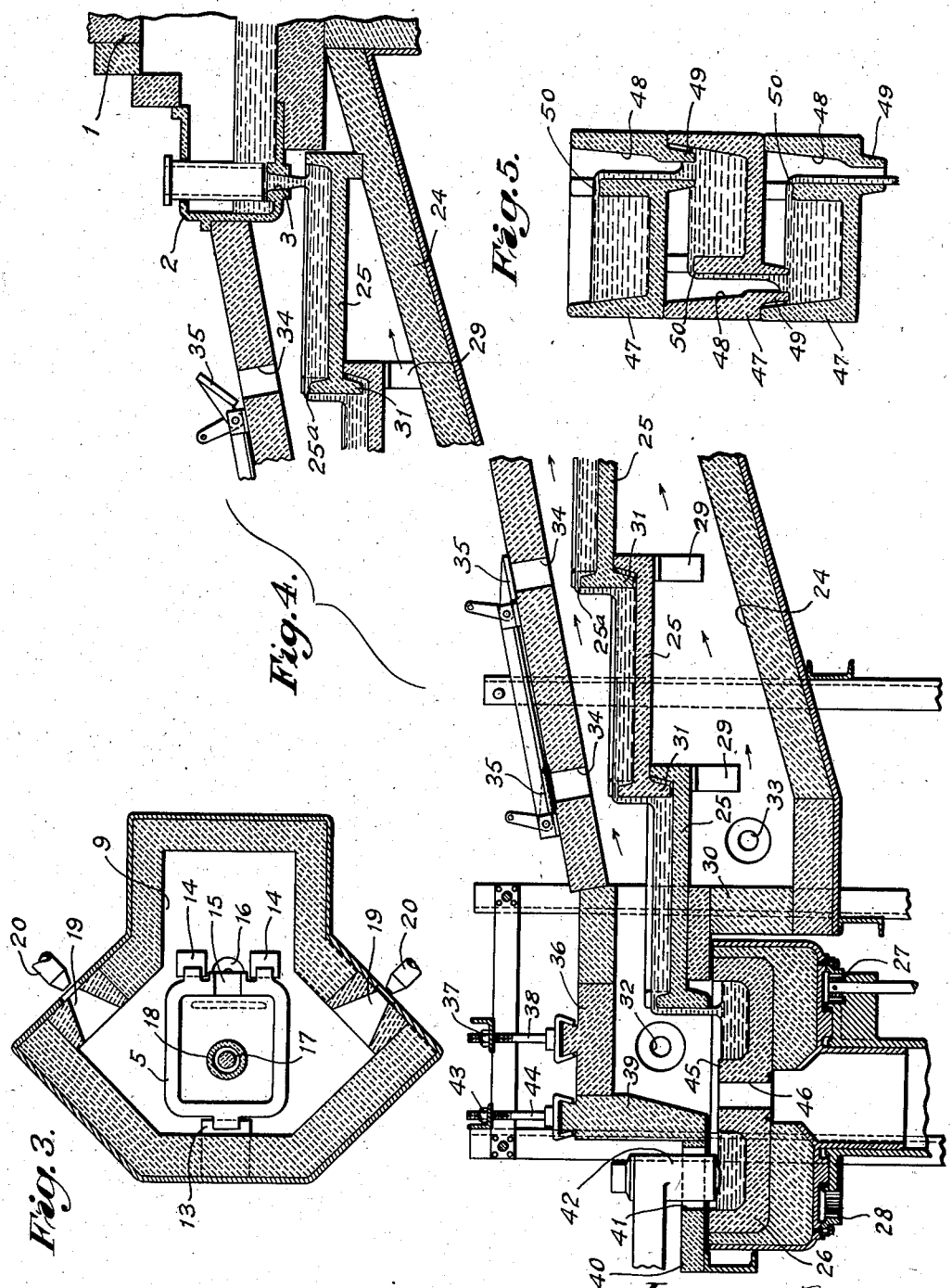
Inventor:
William T. Honiss
by Brown + Parham
Attorneys
Witness:
W. B. Thayer Patented Jan. 1, 1935

1,986,575

UNITED STATES PATENT OFFICE 1,986,575

APPARATUS FOR AND METHOD OF DELIVERING MOLTEN GLASS

William T. Honiss, West Hartford, Conn., assignor to Hartford-Empire Company, Hartford, Conn., a corporation of Delaware Application April 5, 1932, Serial No. 603,267

4 Claims. (Cl. 49—55)

This invention relates to apparatus for and methods of conducting molten glass from a melting tank, or like place of supply, to a delivery container from which glass may be fed in mold charges, gathered, drawn or otherwise removed, and for conditioning or reconditioning the glass as it is conducted to such place of removal.

It is desirable that molten glass fed from a delivery container in mold charges or otherwise removed therefrom shall have a proper working temperature and a uniform viscosity. It also is desirable that the glass passing from the supply tank should be brought to the proper condition, as to temperature and viscosity, as rapidly as possible and in a minimum of space and then maintained in that condition until fed or otherwise removed from the delivery container.

It is usual to provide a continuous flow channel along which molten glass passes from a melting tank to the delivery container and to enclose the space above such channel so as to permit controlled heating or cooling of the glass in the channel. A stream of molten glass flowing along a continuous channel tends to flow more slowly and to become colder at its bottom and sides, thus producing the condition that is known in the art as "channeling." This condition is objectionable in that it tends to prevent uniformity of temperature and viscosity in the glass approaching the glass delivery point. Since heat from the glass is dissipated through the walls of the glass conducting channel and the conditioning heat or temperature regulating medium is applied only to the top surface of the glass in the channel, it is difficult to bring the glass in the flow channel to the proper condition as to temperature and viscosity and to maintain that condition when obtained.

It also has been proposed to muffle the glass conducting channel or conduit by enclosing it in a jacket or shell of refractory material spaced therefrom to permit the walls of the channel to be heated. However, in attempting to provide a muffled glass flow channel or conduit, serious difficulties are encountered. Included among such difficulties may be mentioned the impracticability of producing a monolithic refractory channel of suitable length that will be sufficiently durable and resistant to glass attack for the service intended. Mechanical stresses, unequal expansion and contraction in response to temperature changes, spalling, etc., tend to cause cracks in and seriously impair a monolithic flow channel of suitable length, particularly if the walls thereof are thin, as is necessary for efficient transfer of heat through such walls. Installation and replacement of a monolithic flow channel or conduit in a muffled construction also are difficult of accomplishment and expensive. Nor is it practicable to provide a muffled construction in which the flow channel or conduit is made up of separate sections joined together because such a construction necessarily results in the provision of joints below the glass level. In a muffled construction, the glass would seep through these joints into the heating chamber.

An object of the present invention is to provide a glass delivery apparatus of the muffled type of construction but without the defects or objectionable features of those previously proposed.

A further object of the invention is the provision of a glass delivery apparatus having means for receiving glass from a melting tank or other source of supply and for conducting the glass in a stream to a delivery container in such manner that heat may be applied to the glass at all sides and over a surface of relatively great area, thereby permitting the required conditioning of the glass rapidly and in a space of but relatively slight extent.

A further object of the invention is to provide a glass delivery apparatus having improved facilities for regulably controlling the conditioning or reconditioning of the glass as it is conducted from a melting tank to a delivery container.

A further object of the invention is the provision of an improved glass delivery apparatus of such construction as to permit the manufacture of the component glass conducting parts thereof by the most improved known process and also easy assembly of the component parts of the apparatus and replacement of any of such parts.

Other objects and advantages of the invention will become apparent from the hereinafter given description of practical embodiments of such invention, when the description is considered in conjunction with the accompanying drawings in which such embodiments of the invention are illustrated.

Generally described, the invention contemplates the provision of a series of separate shallow refractory trays through which molten glass flows in a stream from a short boot or extension of a melting furnace, or other source of supply, to a delivery container from which glass is to be fed, gathered, or otherwise removed. The trays and the glass stream are muffled by the refractory walls of a conditioning chamber in which they are disposed. Provision is made for regulably controlled heating or cooling of the trays and the glass stream in the conditioning chamber.

The refractory trays may be spaced so that the glass stream includes a series of cascades as glass of the stream passes from each higher tray to the next lower tray and from the lowermost tray to the glass delivery container.

The heated chamber in which the trays are disposed may be provided with a removable section to permit convenient installation of the trays, or removal and replacement of any of them.

The means for heating the conditioning chamber may be burners, electrical heating elements, or any other known source of heat. The walls of the conditioning chamber may be provided with independently controlled ports, for the admission of controllable bodies of cooling fluid or air and/or for controlled radiation of heat from the glass. The respective trays may be made by hydraulic dry pressing of the best obtainable materials and thus may be adapted for relatively long and efficient use in the service for which they are intended.

In the drawings:

Figure 1 is a vertical sectional view of one form of apparatus embodying the invention, showing one method of arranging the component trays for conducting glass from the supply boot to a glass delivery container;

Fig. 2 is a reduced transverse section through the apparatus shown in Fig. 1, the view being taken substantially on the line 2—2 of Fig. 1;

Fig. 3 is a reduced transverse section substantially on the line 3—3 of Fig. 1;

Fig. 4 is a fragmentary vertical sectional view, showing a modified form of construction in which the trays are disposed in echelon and conduct glass from the source of supply to a rotary delivery container from which glass may be gathered by suction gathering molds, or other suitable known means; and Fig. 5 is a fragmentary vertical sectional view, showing glass conducting trays of a modified form arranged in superposed or nested relation.

Referring now to the drawings and particularly to Fig. 1, the numeral 1 designates a melting tank, or other source of supply of molten glass. In carrying out the invention, I may provide this melting tank with a short boot or lateral extension, such as indicated at 2, into which glass flows from the tank. This boot is provided with an outlet 3 submerged by the glass therein. Flow of glass through the outlet may be regulated and controlled in any suitable known manner, as by a plug or valve 4, which may be reciprocated vertically or adjusted vertically with respect to the upper end of the discharge outlet to permit a predetermined regulable intermittent or continuous flow of glass from the outlet 3.

The glass flowing from the outlet 3 is conducted to a delivery container 5 by a series of refractory trays or glass flow conducting members 6. These trays may be disposed in a substantially vertical series with the respective trays vertically spaced and slightly staggered, substantially as shown. Each of the trays may have an end wall thereof partially cut away at its upper edge to provide a glass flow outlet, as indicated at 7, Figs. 1 and 2.

The adjacent trays preferably are arranged so that glass of the stream flows into each tray adjacent to the end thereof that is opposite to that which is provided with the outlet 7. Adjacent trays are reversed with respect to each other. Glass from each tray, on passing through the outlet 7 of that tray, will fall in a cascade into the glass receiving end portion of the next lower tray. Preferably each tray is provided at its glass delivery end with a depending lip, such as indicated at 8, so that the glass flowing downwardly at that end of the tray will be guided smoothly in a falling sheet into the tray or receptacle immediately therebelow. The lowermost tray of the series may be displaced laterally more than the remaining trays so that glass from the delivery end thereof may fall into the delivery container 5 when the latter is disposed out of vertical alignment with the series of trays.

In the embodiment of the invention shown in Fig. 1, the delivery container 5, the series of trays 6, and the outlet portion of the glass boot or tank extension 2, are all disposed within a conditioning chamber 9. This conditioning chamber is substantially vertical and the walls of the upper end portion thereof may be arranged to abut and cooperate with walls of the boot or extension 2 so that glass from the outlet 3 will issue therefrom into the upper end of the conditioning chamber. The respective trays 6 are supported within the conditioning chamber in any suitable manner, as by inwardly extending lugs, brackets, or blocks 10, on walls of the conditioning chamber. With the arrangement shown, the stream of glass from the outlet 3 of the boot will pass into the uppermost of the trays 6 and thereafter glass will flow through the respective trays to the lowermost tray and thence into the delivery container 5. The latter may be located in a short lateral extension of the lower end portion of the conditioning chamber.

The delivery container 5 is shown as a feed bowl having an outlet opening 11 in its bottom. The outlet portion of this delivery container depends into a suitable opening 12 in the bottom wall of the conditioning chamber so that glass from the outlet of the delivery container may issue into suspension therefrom below the conditioning chamber. Supporting members, such as the blocks indicated at 13 and 14, Fig. 1, support the delivery container 5 in spaced relation with the adjacent walls of the conditioning chamber and so that the outlet portion of the delivery container is properly disposed with relation to the opening 12 in the bottom wall of the conditioning chamber. An overflow spout 15 at the upper edge of the delivery container is located above an opening 16 in the bottom of the conditioning chamber. Should the level of the glass in the delivery container be unduly increased, the excess glass may flow through the overflow spout or waste outlet and thence downwardly through the opening 16 to a cullet receptacle (not shown) or any suitable means for disposing of such excess glass.

A refractory implement 17 is shown in Fig. 1 as depending into the outlet passage or well in the bottom of the delivery container for regulably controlling discharge of glass from the outlet of the delivery container. A tube 18 of refractory material may depend into the glass in concentric relation with the implement 17 for regulably controlling flow of glass to the upper end of the outlet passage. The implement and the tube may be adjusted and/or operated by any suitable known means, many examples of which are known in the art. In fact, any suitable known means may be employed to regulably control the discharge of glass from the outlet of the delivery container for the production of successive suspended mold charge masses or for any other known useful purpose.

The chamber 9 may be provided with any suitable known heating and/or cooling means for conditioning the glass that is passing therethrough from the source of supply to the glass delivery point. In the construction shown in Fig. 1, the side walls of the chamber 9 adjacent to the delivery container 5 are provided with openings, such as indicated at 19, Figs. 1 and 3, through which flames or gases in combustion from burners 20, Fig. 3, may be discharged in proximity to the surface of the glass in the delivery container.

Flames from the burners and/or gases heated thereby thus may heat not only the delivery container 5 and the glass therein but may pass upwardly in the conditioning chamber and heat practically the entire surfaces of the glass conducting trays, the glass therein and the cascades of glass between the individual trays.

Ports, such as indicated at 21, may be provided in walls of the conditioning chamber for admitting cooling fluid or air to dilute the heated gases within the conditioning chamber, to permit radiation of heat from the glass within the conditioning chamber, and/or to regulably control draft conditions therein. Preferably, these openings 21 are located at vertically spaced intervals in the walls of the conditioning chamber and may be located so that there will be a port at approximately the level of the glass in each of the trays. As shown, each of such ports, with the exception of that for the lowermost tray, is located adjacent to the delivery end of the corresponding tray. The volumes of cooling fluid or air or heated gases passing through the ports 21 may be independently and regulably controlled in any suitable known manner, as by providing each port with a hinged shutter, damper or closure 22 together with an individual operating or adjusting mechanism 23 therefor.

Draft conditions within the conditioning chamber may be varied within a considerable range by differential adjustment of the shutters for the respective ports 21. Different local heating and/or cooling effects in various parts of the conditioning chamber likewise may be obtained by such adjustment of the shutters or dampers, together with or independently of adjustment of the burners or other source of heat.

The trays preferably are of sufficient depth to retain therein sufficient glass to flow freely without building up an appreciable level gradient across the tray and without permitting the accumulation of stagnant glass therein. A mixing or homogenizing action thus will take place in the glass in each tray.

The operation of the embodiment of the invention that has been described so far may be substantially as follows:

A regulated volume of glass may flow from the outlet 3 of the boot or tank extension into the uppermost tray 6. Glass will flow the length of the tray and from the outlet 7 thereof downwardly in a sheet into the next tray. Glass will flow the length of this tray through the outlet thereof and downwardly in sheet form to the next tray of the series. Similar flow movements will take place in and between the succeeding trays. From the lowermost tray, glass will flow in sheet form into the delivery container. During its passage between individual trays or receptacles the glass is exposed at all sides to heat from the heating medium within the conditioning chamber 9. This heating medium also affects the entire surface of the glass in each of the trays and the delivery container and the walls of the trays and such container. Conditioning of the glass to bring it to the proper working temperature and to produce uniform viscosity therein thus is facilitated.

A portion of the wall of the conditioning chamber may be made removable and replaceable so as to permit convenient installation and removal and replacement of the respective trays. These trays being small and compact, may be made by hydraulic dry pressing of the best materials, or by any other suitable process for the making of high grade and durable refractory products. When the conditioning chamber is substantially vertical, as shown in Fig. 1, the delivery container may be disposed at a relatively short distance laterally from the associated melting tank, thus effecting an economy in the use of floor space. Also, the straight line distance from the source of supply of molten glass to the delivery point may be relatively short while the total length of flow movement of the glass in passing from the source of supply to such delivery point is sufficient to permit proper and adequate conditioning of such glass.

In the construction shown in Fig. 4, the conditioning chamber, designated 24, is inclined from the vertical. The upper end of this conditioning chamber is supported in proper relationship to the walls of the boot or tank extension 2 so that the glass stream from the boot outlet 3 will fall into the adjacent end of the uppermost of a series of trays 25. These trays are arranged in echelon or "stepped" relation in the conditioning chamber with the lowermost tray arranged to discharge a sheet of glass into a delivery container 26 at the lower end of the conditioning chamber. This delivery container 26 may be a rotary bowl, as shown. Rotary motion may be imparted thereto in any suitable known manner, as by a drive gear 27 in mesh with a ring gear 28 on the rotary bowl.

The trays 25 may be supported in the conditioning chamber 24 in spaced relation with the walls of the latter by suitable supporting means. In the arrangement shown, blocks 29 support the rearward ends of the respective trays. The forward end of each of the trays, except the lowermost tray, rests upon the adjacent end of the rim of the next lower tray. The forward end portion of the lowermost tray is supported by a wall structure 30 at the lower end of the conditioning chamber.

Each of the trays 25 has an outlet 25ᵃ at the upper edge of its forward or delivery end. A depending lip 31 at the delivery end of each tray serves to guide the glass downwardly in a sheet into the succeeding tray or receptacle.

The interior of the conditioning chamber 24 may be heated in any suitable known manner. In Fig. 4, openings are shown at 32 and 33, through which burners may discharge flames or gases in combustion into the conditioning chamber for heating the glass and the trays therein.

The walls of the conditioning chamber above the trays may be provided with ports, such as indicated at 34, independently controlled by individual dampers 35, for regulating heat and draft conditions in different parts of the conditioning chamber.

A block, indicated at 36, in the top of the lower end portion of the conditioning chamber and above the glass in the delivery container 26, may be adjusted vertically, as by turning the nut 37 on the threaded adjusting rod 38. A regulated volume of air thus may be admitted to the space above the glass in the delivery container.

A depending baffle or end wall 39 at the front of the block 36 serves partially to separate the space above the glass in the major portion of the delivery container 26 from the space above the glass in the front or outer portion of such container. The glass in the front portion of the delivery container 26 may be covered by a cover member 40 having a suitable opening 41 therein through which a suitable gathering receptacle 42 may be dipped into glass gathering contact with the glass in the delivery container. The receptacle 42 may be a suction gathering mold of a suction fed glass forming machine. Any other suitable glass gathering receptacle or implement may be employed in any suitable known manner. The baffle 39 may be adjusted vertically, as by turning the nut 43 on the threaded adjusting rod 44, to vary interchange of heat between the space within the lower end of the conditioning chamber and the space over the glass at the gathering station.

The delivery container 26 is shown as having an upwardly extending curb 45 around a central opening 46 in its bottom. The glass level in the container 26 normally is below the level of the curb 45. However, should this level rise above the curb, the excess glass will flow through the opening 46 and through an aligned opening in the supporting structure for the container 26 to any suitable means, not shown, for conducting such glass to a cullet receptacle or any other place desired.

In the modified form of construction shown in Fig. 5, the respective trays 47 are adapted to be nested or arranged in superposed relation with the bottom of one tray resting upon the upper edge or rim of the tray therebeneath. A vertical delivery passage 48 is formed at one end of each tray and terminates at its lower end in the bore of a depending spout 49. This spout depends into the underlying tray or other receptacle. The wall between the delivery passage 48 and the glass receiving cavity or chamber of the tray is partly cut away at its upper edge to provide an outlet, such as indicated at 50, through which glass from the interior of the tray may flow into the delivery passage 48. Thence, the glass flows downwardly in a sheet through the spout 49 to the tray or other receptacle therebeneath without passing outside the confines of the tray.

The respective trays 47 may be arranged in nested relation with the adjacent trays reversed with respect to each other, as shown. The glass passing into each tray will flow longitudinally of that tray before entering the delivery passage thereof.

Trays of the form shown in Fig. 5 may be disposed in any suitable conditioning chamber, such for example as that shown in Fig. 1, and the glass therein brought to a condition of proper working temperature and uniform viscosity.

While the invention has been illustrated in the accompanying drawings as embodied in forehearth or glass delivery structures, it is to be understood that the principle of the invention is applicable to many different constructions for heating or conditioning glass during flow thereof from any suitable source of supply to any place and for any use desired. Various modifications and changes in the construction, combination and arrangement of parts of practical embodiments of the invention may be resorted to without departing from the spirit and scope of the invention.

I claim:

1. In combination, a conditioning chamber, means for delivering a stream of molten glass into one end of said conditioning chamber, a delivery container for receiving glass at the opposite end of said conditioning chamber, and means within said conditioning chamber for receiving the stream of glass in said first named end of said conditioning chamber and for conducting glass of said stream in a sinuous path to said delivery container, said path having spaced portions in which the glass passes in opposite directions in said chamber.

2. Apparatus comprising a substantially vertical conditioning chamber, a source of supply of molten glass at the upper end of said conditioning chamber, a glass delivery container at the lower end of said conditioning chamber, a series of shallow refractory trays within said conditioning chamber for receiving molten glass from said source of supply and for discharging a stream of molten glass into said delivery container, said trays having their glass conducting surfaces spaced vertically and being arranged in staggered relation within the conditioning chamber, adjacent trays of said series being reversed end for end so that the glass conducted by said trays is caused to move horizontally in opposite directions within adjacent trays and vertically, cascade fashion, between adjacent trays.

3. In combination, a series of glass conducting trays in superposed relation, each of said trays having a bottom surface adapted to rest on the rim of the next lower tray of the series, each of said trays having a vertical delivery passage at one end thereof, said delivery passage being formed for glass flow communication with the interior of the tray below the level of the rim thereof and terminating in a depending spout for conducting molten glass downwardly below the level of the bottom of said tray, the adjacent trays of the series being reversed end for end.

4. The method which comprises introducing a stream of molten glass into one end of a conditioning chamber, conducting glass of the stream longitudinally of the conditioning chamber in a series of cascades alternating with oppositely directed substantially horizontal stretches of supported flowing glass, and subjecting the glass of said cascades and said stretches to a temperature influencing medium at substantially all sides thereof.

WILLIAM T. HONISS.